US006835348B2

(12) United States Patent
Hirosue et al.

(10) Patent No.: US 6,835,348 B2
(45) Date of Patent: Dec. 28, 2004

(54) METHOD AND DEVICE FOR PRODUCING OPEN TYPE POLYMIDE MOLDINGS, AND BASE MATERIAL FOR REFLECTIVE BODIES IN LIGHTING EQUIPMENT

(75) Inventors: Haruhiko Hirosue, Yamagata (JP); Shigeo Shibata, Yamagata (JP); Hideaki Machida, Tokyo (JP)

(73) Assignees: Mogami Denki Corporation, Yamagata (JP); Dupont-Toray Co., Ltd., Tokyo (JP)

( * ) Notice: Subject to any disclaimer, the term of this patent is extended or adjusted under 35 U.S.C. 154(b) by 23 days.

(21) Appl. No.: 09/926,143

(22) PCT Filed: Jan. 12, 2001

(86) PCT No.: PCT/JP01/00127

§ 371 (c)(1),
(2), (4) Date: Sep. 10, 2001

(87) PCT Pub. No.: WO01/51270

PCT Pub. Date: Jul. 19, 2001

(65) Prior Publication Data

US 2002/0160214 A1 Oct. 31, 2002

(30) Foreign Application Priority Data

Jan. 13, 2000 (JP) .......................................... 2000-004209

(51) Int. Cl.[7] .............................................. B29C 43/02
(52) U.S. Cl. ........................ 264/544; 264/544; 264/553
(58) Field of Search ................................. 264/319, 320, 264/331.19, 547, 553, 327, 544; 425/383, 388, 387.1, 397, 403.1; 428/458

(56) References Cited

U.S. PATENT DOCUMENTS 3,687,594 A * 8/1972 Medendorp .................. 425/388
4,971,748 A * 11/1990 Sado et al. ................... 264/553

FOREIGN PATENT DOCUMENTS

| EP | 0392674 A2 | * | 3/1990 |
| JP | 51-73070 | * | 6/1976 |
| JP | 2000202901 A | * | 1/1999 |
| JP | 11273431 A | * | 10/1999 |

OTHER PUBLICATIONS

Merriam Webster's Collegiate Dictionary, (Springfield, MA) Merriam Webster's 10th ed., p. 322.*

* cited by examiner

Primary Examiner—D. S. Nakarani
Assistant Examiner—Kevin R. Kruer
(74) Attorney, Agent, or Firm—Rader, Fishman & Grauer PLLC

(57) ABSTRACT

A polyimide film F is brought into an intimate contact with a molding die 3 having a concave molding surface 3a so as to tightly close the open end thereof, and the polyimide film F is bent to deform only by the pressure difference of gas while being heated in a contactless manner. Molding is conducted by applying depressurization for a space 8 on the side of the molding die 3 relative to the polyimide film F while pressurizing the space 9 on the opposite side for the pressure difference at least in the final stage of the bending deformation so as to be in intimate contact with the concave molding surface 3a.

4 Claims, 4 Drawing Sheets

METHOD AND DEVICE FOR PRODUCING OPEN TYPE POLYMIDE MOLDINGS, AND BASE MATERIAL FOR REFLECTIVE BODIES IN LIGHTING EQUIPMENT

TECHNICAL FIELD

This invention concerns a manufacturing method and an apparatus for an open type polyimide molding product, as well as a reflector substrate for use in illumination equipments comprising a molding product thereof and, more specifically, it relates to a manufacturing method and an apparatus for an open type polyimide molding product, as well as a reflector substrate for use in illumination equipments capable of molding with no scratches on the surface or uneven thickness upon molding an open type polyimide molding product from a polyimide film.

BACKGROUND ART

Since polyimide films are excellent in heat resistance, a self-fire extinguishability and have excellent dynamic properties, chemical properties and electrical insulation property, they have been used generally as parts for electric products and electronic products utilizing such properties. As one of application uses for electric products, there is a proposal of using them as a reflector substrate for use in illumination equipments such as head lamps of automobiles in view of their excellent heat resistance and electric insulation property, as well as reduced weight (Japanese patent application Kokai publication No. 11-273431).

By the way, the reflector for use in illumination equipments is molded from a polyimide film as a so-called open type polyimide molding product and it is necessary that the light reflection property can be accurately controlled when a metal reflection layer is vapor deposited on the surface as required characteristics. Accordingly, it is important that the open type polyimide molding product is molded with no scratches on the surface.

However, while the polyimide film is excellent in the heat resistance as described above, when it is molded by press molding using molding dies comprising a female die and a male die as in the manufacturing method disclosed in Japanese patent application Kokai publication No. 11-273431, it results in a problem of causing defects such as scratches on the surface of the molding product. Further, even when a vacuum forming method is used instead of the pressure molding method in order to suppress such scratches, it still leaves a problem that unevenness in the thickness is caused when merely molding by an existent vacuum forming method and, in an extreme case, holes are formed making it difficult to stabilize the shape of the molding product.

DISCLOSURE OF THE INVENTION

An object of this invention is to provide a manufacturing method and an apparatus for an open type polyimide molding product capable of reducing scratches on the surface and unevenness in the thickness.

Another object of this invention is to provide a reflector substrate for use in illumination equipments comprising an open type polyimide molding product of excellent shape stability with less scratches on the surface and unevenness in the thickness.

A method of manufacturing an open type polyimide molding product according to this invention for attaining the foregoing object comprises bringing a polyimide film into an intimate contact with a molding die having a concave molding surface so as to tightly close the open end thereof, bending to deform the polyimide film under contactless heating only by a pressure difference of gas, and depressurizing a space on the side of the molding die and pressurizing a space on the opposite side relative to the polyimide film for providing the pressure difference at least in the final stage of the bending deformation and bringing the film into an intimate contact with the concave molding surface.

As described above, since a polyimide film as the molding material is bent to deform only by the pressure difference of gas while plasticizing the film by contactless heating, no scratches are caused. Further, since the polyimide film is brought into an intimate contact with the concave molding surface of a molding die only by the pressure difference by applying depressurization on the side of the molding die and pressurization on the opposite side at least in the final stage of the bending deformation, it can be molded with no unevenness in the thickness and without causing air cavities relative to the concave molding surface.

Molding with no unevenness in the thickness and air cavities described above is enabled by applying depressurization/pressurization simultaneously on both surfaces of the polyimide film at least in the final stage of the operation for the bending deformation but it can not be attained by merely depressurizing the space on the side of the molding die or pressurizing the space on the opposite side.

More specifically, contactless heating may be applied by disposing a heating portion to a pressing die and/or a molding die and irradiating radiation heat and/or discharging a heating gas from the pressing die. Operation for depressurization and pressurization is conducted by disposing a porous metal or forming a number of pores to the concave molding surface of the molding die and the inner surface of the pressing die and conducting by way of the porous metal or the pores. Further, the shape of the polyimide film after molding is fixed by disposing a cooling portion to the molding die and/or pressing die and by the cooling effect of the cooling portion and/or releasing of the cooling gas from the pressing die.

Further, in a preferred apparatus for manufacturing an open type polyimide molding product for practicing the manufacturing method described above, a molding section is constituted with a molding die having a concave molding surface and a pressing die in press contact with an open end of the molding die, the molding die is connected with a negative pressure source and the pressing die is connected with a pressurization source. The manufacturing apparatus can be provided with a film supply mechanism for supplying and setting a polyimide film to the molding section or a molding product take out mechanism for taking out the molding product from the molding section.

The open type polyimide molding product obtained according to this invention can be utilized effectively as a reflector for use in illumination equipments such as head lamps of automobiles by disposing a reflection layer by vacuum deposition of metal.

BEST MODE FOR CARRYING OUT THE INVENTION

Figure 1:
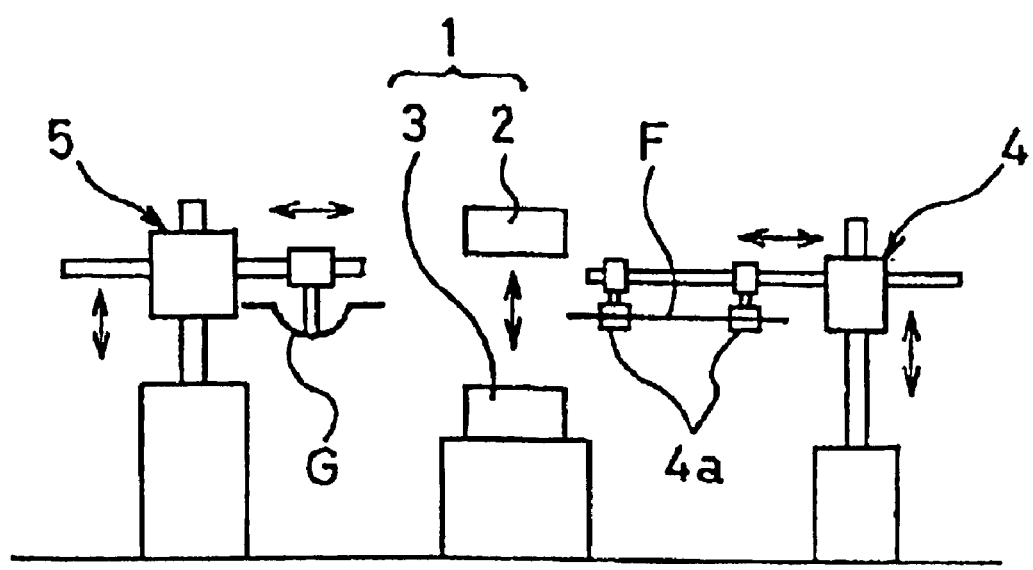
FIG. 1 is a schematic view illustrating an example of an apparatus for manufacturing an open type polyimide molding product practicing this invention.

In this invention, the open type polyimide molding product is a molding product molded three-dimensionally so as to have an open end on at least one side.

The polyimide film used for molding the open type polyimide molding product is a molding film product from heat resistant polyimides. Polyimides derived from aromatic tetracarboxylic acids and aromatic diamines are preferred.

Further, for the polyimide film, particularly, for the reflection substrate for use in head lamps of automobiles, those having such characteristics as not plastically deformed at 200° C. or higher, preferably, 220° C. or higher, further preferably, 230° C. or higher, as the heat resistant property are desirable. The thickness of the polyimide film, while different depending on the application use of the molding product, is within a range of 8 to 200 μm, preferably, 12 to 180 μm and, further preferably, from 25 to 175 μm, in view of the production efficiency capable of molding with no occurrence of unevenness in the thickness or easy availability of the film.

In a molding machine for molding a polyimide film into an open type polyimide molding product of a predetermined shape, a molding section is preferably disposed in which a molding die having a concaved molding surface is assembled with a pressing die so as to cover the open end of the molding die. The pressing die retains and keeps a polyimide film between it and the open end of the molding die to form spaces on the side of the pressing die and on the side of the molding die relative to both surfaces of the polyimide film.

It may suffice that the pressing die has a function of covering the open end of the molding die and it is not always necessary to have a convex molding surface for shaping the polyimide film. However, so long as it has a convex surface with a smaller outer dimension than the concave molding surface of the molding die and not in contact with the polyimide film in the course of the molding process, such a concave surface may be disposed.

The molding die and the pressing die are preferably placed vertically movably with the molding die as a lower die and the pressing die as an upper die. The vertical relationship between the molding die and the pressing die, the vertical relationship may of course be reversed such that the molding die is an upper die and the pressing die is a lower die. Further, the molding die and the pressing die may also be disposed being opposed in the right-to-left direction. However, since the heated polyimide film is deformed downwardly by gravitational force, this may lead to a worry that asymmetricity appears in the shape of the open type polyimide molding product.

In this invention, the polyimide film is brought into an intimate contact with the open end of the molding die described above so as to tightly close the open end and, more preferably, the polyimide film is put between the molding die and the pressing die and the polyimide film in this state is bent to deform by providing only the pressure difference of the gas between both surfaces of the film while plasticizing the film by contactless heating with no contact of the rigid surface of the die or the like. The pressure difference described above may be applied by a method of merely pressurizing the space on the side of the pressing die relative to the polyimide film, by merely depressurizing the space on the side of the molding die or simultaneously applying pressurization for the space on the side of the pressing die and depressurization for the space on the side of the molding die. However, it is necessary that the polyimide film is brought into an intimate contact with the concave molding surface of the molding die by simultaneously applying pressurization for the space on the side of the pressing die and depressurization for the space on the side of the molding die at least in the final stage of the bending deformation.

As described above, since bending deformation is conducted only by the pressure difference of gas with no contact of the rigid molding surface to the polyimide film, scratches are not formed on the surface of the polyimide film. Further, since the polyimide film is in the intimate contact with the concave molding surface of the molding die by applying depressurization for the space on the side of the molding die and pressurization for the space on the side of the pressing die for providing the pressure difference at least in the final stage of the operation of bending deformation, even a polyimide film having characteristics less deformed plastically can be molded with no unevenness in the thickness and with no air cavities to the concave molding surface. Particularly, in the so-called vacuum forming conducted only by depressurization from the start to the completion of the bending deformation operation, since the polyimide film is adsorbed to suction pores formed in the concave molding surface when the polyimide film is in the intimate contact with the concave molding surface to clog them, air cavities are formed relative to the concave molding surface tending to make the shape of the molding products instable.

In or for this invention, the application of a gas pressure differential may be carried out particularly preferably in a manner such that while for an initial portion of the curving deformation of the polyimide film up to when the curving deformation reafhes 40% to 99% of the depth of the concave molding surface after the initiation of the curving deformation, the curving deformation is effected only by a pressurization to be applied to the closed chamber on the side of the pressing die, for an ending portion of the curving deformation up to when the polyimide film is then brought to intimately contact the concave molding surface, it is effected by a simultaneous application of pressurization and depressurization to be applied on the side of the pressing die and the side of the molding die respectively.

For avoiding unevenness in the thickness or the like, it is preferred that no localized concentrated flow of the gas is caused upon pressurization or depressurization. For the countermeasure, the concave molding surface of the molding die and the inner surface of pressing die may be provided with a porous metal, or formed with a number of distributed pores, and the back of the porous metal or the pores are in communication with a negative pressure source in the case of the molding die and in communication with a pressurization source in the case of a pressing die, to conduct depressurization and pressurization. By the provision of the porous metal or the number of pores release of the pressurizing gas (compressed gas) or suction of the depressurizing gas can be conducted moderately and uniformly with no localized concentration of the gas. As the gas for the pressurization source, a pressurized air or an inert gas such as pressurized nitrogen is preferably used.

More preferably in this invention, the back of the porous metal or the pores on the side of the pressing die may be in communication with a negative source pressure or atmospheric air by way of a switching valve in addition to the pressurization source. When the space on the side of the pressing die is made in communication with the negative pressure source and temporarily depressurization is conducted, the preparatory operation in the initial stage of the molding can be made smooth. Further, the back of the porous metal or the pores on the side of the molding die may be in communication by way of a switching valve to the pressurization source in addition to the negative pressure source. With such a switchable system, when the molding product after the molding is released from the molding die, the molding product can be released smoothly by blowing out a pressurized gas by switching to the pressurization source.

As the contactless heating means for the polyimide film, a heating portion may be disposed to the pressing die and/or the molding die and radiation heat may be radiated from the pressing die or the molding die, or a heating gas may be used as a pressurizing gas (compressed gas) of the pressurization source connected with the pressing die and the heating gas may be released. For the heating gas, a heated air or an inert gas such as heated nitrogen may be used. The heating portion can be provided to the pressing die and/or the molding die by burying a heater nichrome wires, burying of the heater and sealing of the heat medium, or circulation of the heat medium. A control device for adjusting the amount of heating is preferably disposed to the contactless heating means described above.

A cooling portion is preferably disposed to the molding die and/or the pressing die, particularly, the molding die as a means for fixing the shape of the molding product after the molding. The cooling portion may be adapted to blow out a cooling gas from a pressurization source disposed switchably in combination with the negative pressure source or adapted to circulate a coolant in the molding die.

The cooling means for fixing the shape of the molding product may be disposed independently to the outside of the molding die. The cooling means disposed independently of the molding die may be adapted to cool the molding product released from the molding die at a place other than the molding die, or may be adapted to blow a cold air from the outside while containing the product in the molding die as it is.

In the apparatus for manufacturing the open type polyimide molding product according to this invention, a film supply mechanism may be disposed for supplying the polyimide film to the molding section and setting it to the molding section. Since the polyimide film can be supplied and set also by manual operation, the film supply mechanism is not always necessary but it is useful as a means for man power saving or automation. The film supply mechanism has a plurality of gripping portions for gripping the end of the polyimide film, and has a function of extending the polyimide film to supply a tension by the movement of the gripping portions, or controlling the tension.

The film supply mechanism preferably grips the polyimide film cut out into a rectangular or square shape by at least four positions but it may preferably be adapted to grip also a polygonal shape (trigonal shape, pentagonal shape, etc.) or a doughnuts shape in addition to rectangular shape. A plurality of gripping portions preferably grip the film end at a plurality of positions thereby applying tension to the film and setting the film in an intimate contact with the open end of the molding die while keeping the tensile state.

The structure of the gripping portion may be adapted to sandwich the film end from both surfaces, or adapted to adsorb the film surface with a suction nozzle by utilizing a negative pressure or adapted to adsorb to the film surface by utilizing static electricity. The plurality of gripping portions are constituted such that they can move relatively to the molding section and the gripping portions can be moved relative to each other. The relatively movable constitution described above can provide tension to the polyimide film and facilitate setting in intimate contact with the open end of the molding die.

In addition to the foregoings, the apparatus for manufacturing the open type polyimide molding product may be provided with a molding product take out mechanism for taking out the molding product after molding out of the molding die, and a removing mechanism for removing unnecessary portions from the molding product after the molding. The molding product take out mechanism is preferably adapted to adsorb and pick-up by a suction nozzle undergoing the negative pressure. Further, for the removing operation by the removing mechanism, conventional press cutting method or boring method can be used. Such additional facilities are not essential since they can be conducted by manual operation but provision of them enables automation.

A method of manufacturing an open type polyimide molding product according to this invention is to be explained with reference to preferred embodiments shown in the drawings.

FIG. 1 shows an example of an apparatus for practicing the manufacturing method according to this invention.

A molding section 1 comprises a constitution in which a molding die 3 is disposed as a lower die and a pressing die 2 is disposed vertically movably as an upper die. A film supply mechanism 4 is disposed to one of both sides of the molding section 1 and a molding product take out mechanism 5 is disposed to the other of them. The film supply mechanism 4 grips a polyimide film F as a molding material by gripping portions 4a, supplies it between the molding die 3 and the pressing die 2 and sets the same to the molding section 1 to be described later. An open type polyimide molding product G completed with molding in the molding section 1 is picked up by the molding product take out mechanism 5 from the molding section 1 and transported to an unnecessary portion removing mechanism (not illustrated), and unnecessary portions at the periphery of the molding product are removed.

Figure 2:
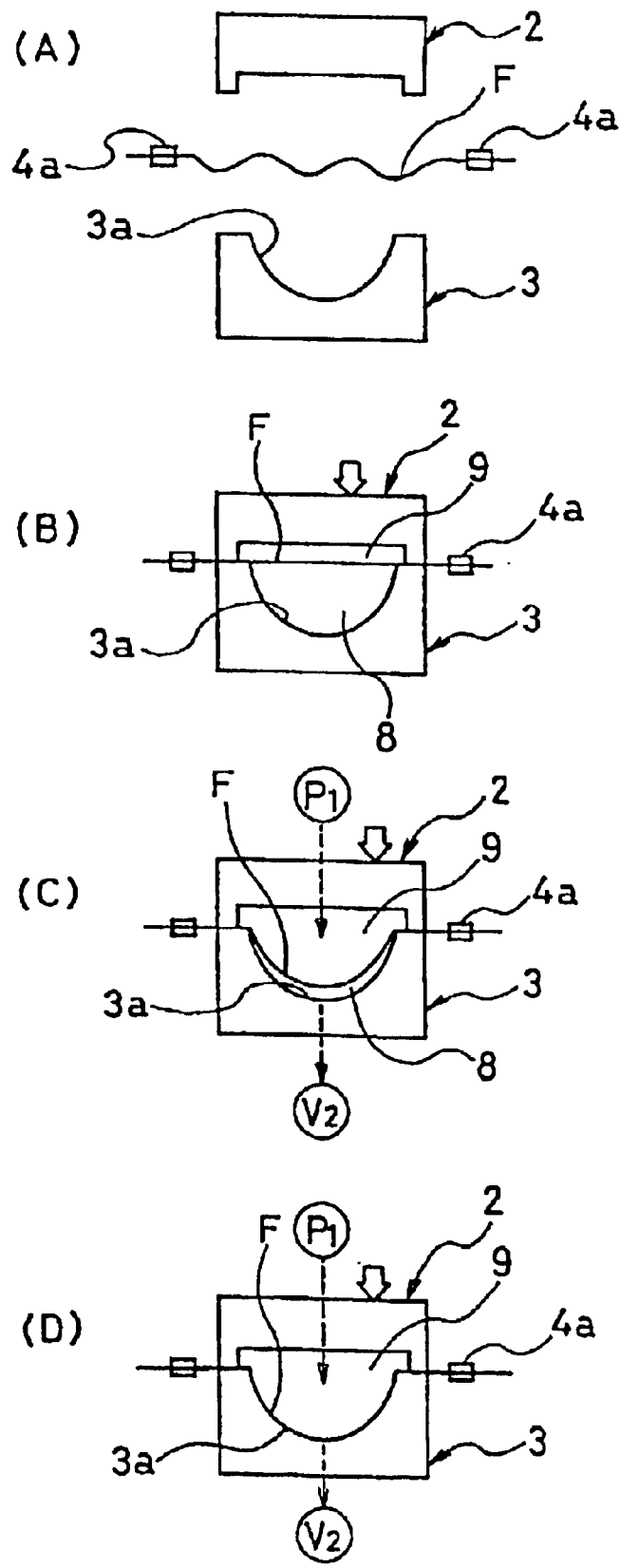
FIGS. 2(A)–(D) are step charts illustrating an example of a molding process for manufacturing an open type polyimide molding product according to this invention.

FIG. 2 shows an example of a molding process for practicing the manufacturing method according to this invention.

Figure 4:
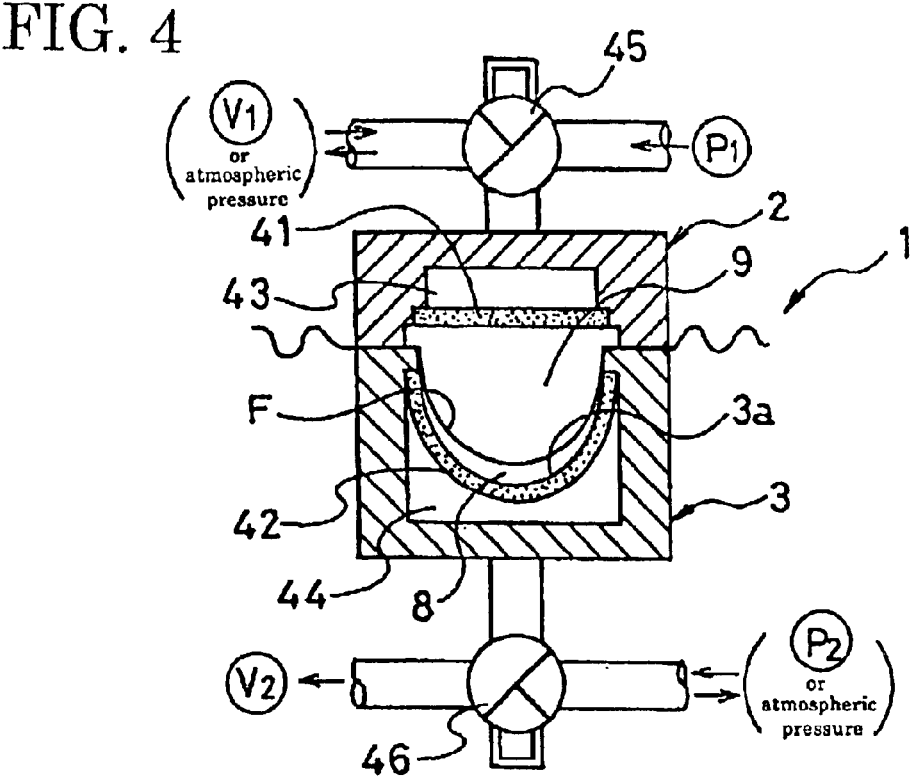
FIG. 4 is a schematic view illustrating an example of a molding section used in the molding process in FIG. 2.

Process in FIG. 2, dies disposed vertically as shown in FIG. 4 are used as the molding section 1. In the molding section 1, a molding die 3 having a concave molding surface 3a at the inner surface is disposed as a lower die, and a pressing die 2 having no molding surface on the inner surface is disposed as an upper die. Both of the upper and lower dies 2 and 3 are provided at the inner surfaces thereof with porous metals 41 and 42, in which the porous metal 42 forms a concave molding surface 3a at the inner surface.

Further, at the back 43 of the porous metal 41, a pressurization source at a pressurizing force $P_1$ and a negative pressurization source at a vacuum pressure $V_1$ or atmospheric air are alternatively switched by way of a three-way switching valve 45, while at the back 44 of the porous metal 42, a pressurization source at a pressurizing force $P_2$ or atmospheric air and a negative pressure source at a vacuum pressure $V_2$ are alternatively switched by way of a three-way switching valve 46. Further, the pressurizing forces $P_1$ and $P_2$, and the vacuum pressures $V_1$ and $V_2$ are set equal with the die clamping pressure or smaller than the die clamping pressure between both of the upper and lower dies 2 and 3.

In the molding process in FIG. 2 using the molding section 1, at first as shown in FIG. 2(A), a polyimide film F is gripped to gripping portions 4a of the film supply mechanism 4 and supplied between the pressing die 2 and the molding die 3 and, at the same time, contactless heating is started by radiation heat from the heating portion incorporated in both of the dies 2 and 3 (not illustrated).

Then, as shown in FIG. 2(B), the pressing die 2 and the gripping portions 4a are lowered, and the polyimide film F is brought into contact with an open end of the molding die 3 and put to a state sandwiched between the pressing die 2 and open end of the molding die 3. In the state shown in FIG. 2(B), an atmospheric pressure or a vacuum pressure $V_1$ is applied by way of a three-way switching valve 45 (refer to FIG. 4) to a space 9 between the pressing die 2 and the polyimide film F, while an atmospheric pressure or a pressurizing force $P_2$ is applied by way of a three-way switching valve 46 (refer to FIG. 4) to a space 8 between the molding die 3 and the polyimide film 1, and the polyimide film F is heated in a contactless manner in this state by the radiation heat from the heating portions incorporated in both of the dies 2 and 3.

Then, as shown in FIG. 2(C), the polyimide film F is bent to deform only by a pressurizing force $P_1$ toward the molding die 3 by pressurizing the space 9 by the pressurizing force $P_1$ and releasing the space 8 to the atmospheric pressure while continuing the contactless heating by the switching of the three-way switching valves 45 and 46, and the bending deformation is continued till the space 8 is reduced to a slight gap. After a time interval of 1 to 5 sec from the instance the space 8 is decreased to the slight gap, the three-way switching valve 46 is switched and a vacuum pressure $V_2$ is applied to the space 8. As described above, by applying the pressurizing force $P_1$ to the space 9 and simultaneously applying the vacuum pressure $V_2$ to the space 8 while continuing the contactless heating, the polyimide film F is brought into an intimate contact with the concave molding surface 3a of the molding die 3 as shown in FIG. 2(D) and the pattern (for example, embossed pattern) on the concave molding surface 3a is transferred.

After keeping the state for about one min, heating from the heating portions incorporated in the pressing die 2 and the molding die 3 is stopped and then a cooling operation of the cooling sections incorporated in the pressing die 2 and the molding die 3 is started to conduct cooling for about 10 min to set the molded shape. Then, the pressurizing operation, the depressurizing operation and the cooling operation are stopped, the pressing die 2 is elevated and the open type polyimide molding product G is taken out by the molding product take out mechanism 5.

The degree of depressurization for the space 8 and the degree of pressurization for the space 9 are important control conditions for intimate contact of the polyimide film F to the concave molding surface 3a, so as not to cause surface scratches or unevenness in the thickness and not to contact to both of the dies. The degree of depressurization and degree of pressurization are preferably controlled by a minute pressure difference gage disposed to the pressing die 2 and a minute pressure difference gage disposed to the molding die 3 but it may be controlled also by the degree of pressurization of the pressurization source and the degree of depressurization of the negative pressure source.

Figure 3:
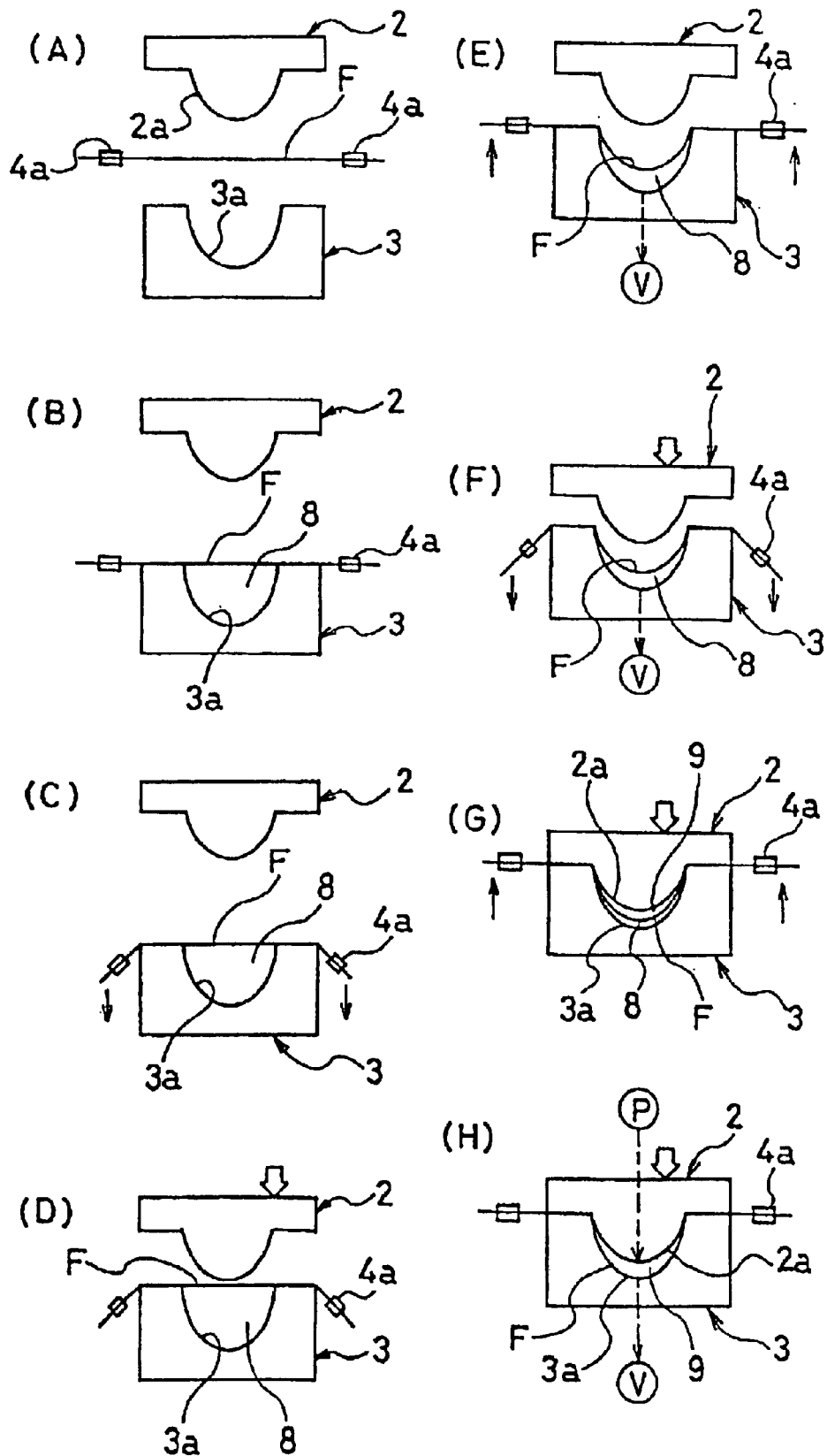
FIGS. 3(A)–(H) are step charts illustrating another example of a molding process for manufacturing an open type polyimide molding product according to this invention.

FIG. 3 shows an example of another molding process for practicing the manufacturing method according to this invention.

Figure 5:
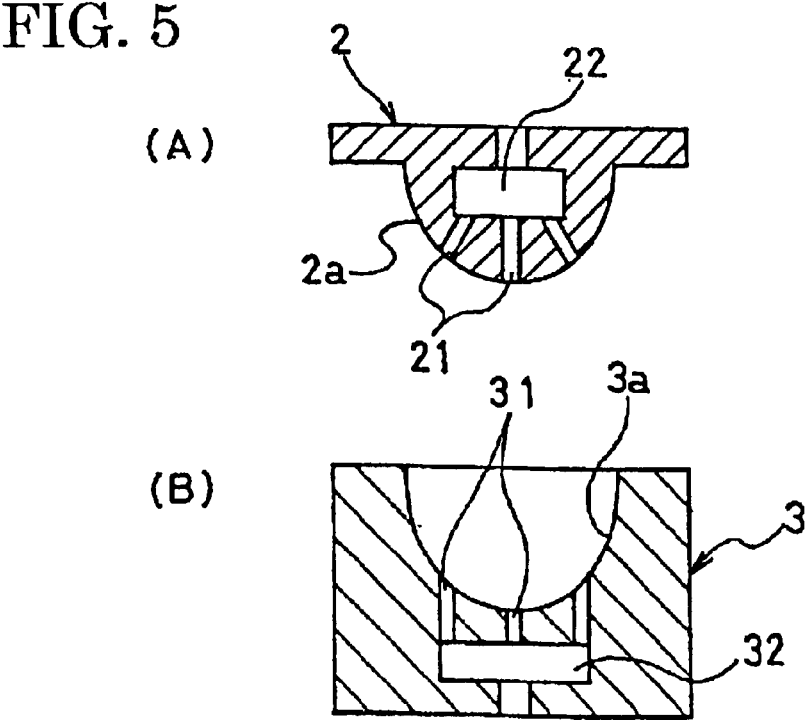
FIG. 5 shows a molding section used in the molding process in FIG. 3 in which (A) is a vertical cross sectional view of a pressing die and (B) is a vertical cross sectional view of a molding die.

In the molding process in FIG. 3, dies as shown in FIGS. 5(A) and (B) are used as the molding section 1.

FIG. 5(A) shows a pressing die 2 constituting one of the molding section 1, in which a convex surface 2a is present on the inner surface and a plurality of pores 21 are formed at the surface. At the back 22 of the pores 21, a pressurization source at a pressurizing force $P_1$ and a negative pressure source at a vacuum pressure $V_1$ or atmospheric air are switched alternately by way of a three-way switching valve 45 in the same manner as in the pressing die of the molding section in FIG. 4. Particularly, a heating gas can also be supplied from the pressurization source. Since the convex surface 2a of the pressing die 2 is not a molding surface to a polyimide film F but is mainly intended to make the contactless heating efficient, it is formed to a smaller outer diametrical size than the concave molding surface 3a on the side of the molding die 3.

On the other hand, FIG. 5(B) shows a molding die 3 constituting the other of the molding section 1 and having a concave molding surface 3a for molding a polyimide film F. A number of pores 31 are formed on the surface and, at the back 32 of the pores 31, a pressurization source at a pressurizing force $P_2$ or atmospheric pressure or a negative pressure source at a vacuum pressure $V_2$ can be switched alternately by way of a three-way switching valve 46 in the same manner as the molding die in FIG. 4.

In the molding process shown in FIG. 3, at first as shown in FIG. 3(A), a polyimide film F is supplied while being kept in a strained state by the gripping portions 4a of a film supply mechanism 4 between the pressing die 2 and the molding die 3 and the polyimide film F is preliminary heated by radiation heat from the heating portions incorporated in the pressing die 2 and the molding die 3.

Then, as shown in FIG. 3(B), the polyimide film F is lowered while absorbing the increase of the size due to heating by controlling the space between each of the grip portions 4a and brought into contact with the open end of the molding die 3. Further, as shown in FIG. 3(C), the gripping portions 4a are lowered to bring the polyimide film F into an intimate contact with the open end of the molding die 3 to make the space 8 surrounded with the concave molding surface 3a airtight.

Then, as shown in FIG. 3(D), the pressing die 2 is lowered while emitting a heating gas (hot blow) or irradiating radiation heat from the pores 21 (refer to FIG. 5) of the pressing die 2 to heat the polyimide F in a contactless manner. At the same time, as shown FIG. 3(E), the polyimide film F is bent to deform in a concave shape toward the molding die 3 while applying depressurization to the space 8 of the molding die 3 by way of the pores 31.

Further, as shown in FIG. 3(F), the bending deformation of the polyimide film F is advanced till the space 8 is decreased to a slight gap while controlling the lowering speed of the pressing die 2, the contactless heating temperature and the depressurization rate for the space 8. Then, at the instance the space 8 is decreased to a slight gap as shown in FIG. 3(G), a flange part of the pressing die 2 is brought into an intimate contact with the open end face of the molding die 3 to form a slight space 9 in a non-contactless manner between the convex surface 2a of the pressing die 2 and the polyimide film F.

After the instance the space 8 and the space 9 are formed putting the polyimide film F therebetween, supply of the pressurization gas to the space 9 is started to conduct pressurization and, at the same time, depressurization to the space 8 is also applied continuously and, while continuing the contactless heating, the polyimide film F is brought into an intimate contact with the concave molding surface 3a of the molding die 3 as shown in FIG. 3(H), and the pattern of the concave molding surface 3a is transferred. Subsequently, fixing for the shape like that in the step shown in FIG. 2 is applied to obtain an open type polyimide molding product G.

As described above according to this invention, the open type polyimide molding product can be molded with no scratches on the surface, with no defects such as unevenness in the thickness and air cavities and in a state free from whitened portions or puncture. Accordingly, when metal is vacuum deposited to the molding product to manufacture a reflector for use in illumination equipments for instance, a reflectivity is high and reflected light at high efficiency can be reflected. Further, since the molding product transferred with the pattern on the surface of the die according to the manufacturing method of this invention can transfer the pattern of the die surface faithfully, a surface of good appearance can be obtained.

This invention is to be described more specifically by way of examples but the invention is not restricted to the examples.

For "surface defects" described in the following examples and comparative examples, aluminum was vacuum deposited on the concave surface of the open type polyimide molding product and the reflected light from the surface is evaluated with naked eyes. "Unevenness of the thickness" and "whitening" were evaluated with naked eyes for the open type polyimide molding product before vacuum vapor deposition of aluminum by using transmission light.

EXAMPLE 1

Using a molding machine having a molding section shown in the drawing (open diameter: 100 mm, depth: 50 mm, for concave molding surface), a polyimide film ("Kapton 200 KJ", 50 μm thickness, manufactured by E.I. Dupont & Nemours Co. Ltd.) was bent to deform only by the pressure difference of gas in the same manner as in the molding process shown in FIG. 2 at the surface temperature for each of the pressing die and the molding die of 240° C., the degree of pressurization for the space 9 of 0.4 MPa, the space 8 being in communicating with atmospheric air, and a vacuum pressure at a depressurization degree of 40 kPa was applied to the space 8 at the instance it was bent to deform to about 90% depth of the concave molding surface. As described above, depressurization/pressurization were applied simultaneously to the space 8 and the space 9 at the final stage of the bending deformation to bring the polyimide film into an intimate contact with the concave molding surface of the molding die, to obtain an open type polyimide molding product.

The obtained open type polyimide molding product was free from localized unevenness in the thickness and with no defects caused by air cavities and no whitened portion was observed. When aluminum was vapor deposited at about 0.5 μm thickness on the concave surface of the open type polyimide molding product and the surface defect was evaluated, no surface defects were found at all and it showed fine light reflectability.

Comparative Example 1

Using a molding section comprising a female die having a concave molding surface with an open diameter of 100 mm and a depth of 50 mm and a male die having a convex molding surface of a substantially identical size, a polyimide film identical with that used in Example 1 was pressure molded by intimate contact with the female die and the male die while setting the surface temperature for each of the female die and the male die to 240° C. to obtain an open type polyimide molding product.

In the obtained open type polyimide molding product, a number of scratches at such an extent as could be distinguished even when the aluminum was not vapor deposited on the entire concave surface. Further, many uneven portions for the transmission light due to unevenness in the thickness and whitened portions were observed at the top end and the neck of the open type polyimide molding product and, particularly, holes were observed in the neck.

Comparative Example 2

Vacuum pressure forming was conducted under the conditions quite identical with those of Example 1 except for opening the space 9 on the side of the pressing die to an atmospheric pressure and applying only the depressurization at a depressurization degree of 40 kPa to the space 8, to obtain an open type polyimide molding product.

In the obtained open type polyimide molding product, scratches were not found in the concave surface but many unevenness in the thickness was observed at the top end and the neck of the open type polyimide molding product.

INDUSTRIAL APPLICABILITY

It can be utilized for substrates such as of a reflector for use in illumination equipments.

What is claimed is:

1. A method of manufacturing an open polyimide molding product which comprises:

bringing a polyimide film into an intimate contact with a molding die having a concave molding surface so as to tightly close an open end thereof to form a space on the side of the molding die surrounded by the polyimide film and the concave molding surface;

disposing a pressing die to the open end of the molding die so as to seize the polyimide film to form a space on the side of the pressing die surrounded by the polyimide film and an inner surface of the pressing die;

causing the polyimide film to be deformed by pressurizing with gas from an initial stage to a final stage and plasticizing the polyimide film through a contactless heating in a manner such that the polyimide film is maintained not to contact the concave molding surface;

bending, during the initial stage, to deform the polyimide film under contactless hearing only by pressurizing gas in the space on the side of the pressing die; and at the final stage of the bending deformation, simultaneously depressurizing gas in the space on the side of the molding die and pressurizing gas in the space on the side of the pressing die thereby bringing the polyimide film into intimate contact with the concave molding surface to eliminate a gap between the polyimide film and the concave molding surface, wherein the concave molding surface has a depth and the final stage commences when the bending deformation of the film reaches a distance in a range of approximately 40% to 99% of the depth of the concave molding surface.

2. A method of manufacturing an open polyimide molding product as defined in claim 1, wherein the polyimide film is heated in a contactless manner by disposing a heating portion to the pressing die and/or the molding die thereby radiating radiation heat and/or releasing a heating gas from the pressing die.

3. A method of manufacturing an open polyimide molding product as defined in claim 2, wherein a porous metal or a number of pores are disposed to the concave molding surface of the molding die and the inner surface of the pressing die, and the space on the side of the molding die is depressurized and/or the space on the side of the pressing die is pressurized by way of the porous metal or the pores.

4. A method of manufacturing an open polyimide molding product as defined in claims 1 to 3, wherein a cooling portion is disposed to the molding die and/or the pressing die, and the shape of the polyimide film after molding is fixed by the cooling effect of the cooling portion and/or releasing the cooling gas from the pressing die.

* * * * *